Oct. 9, 1956  A. L. NORGIEL ET AL  2,765,596
GRINDING JIG
Filed Jan. 7, 1954  3 Sheets-Sheet 1
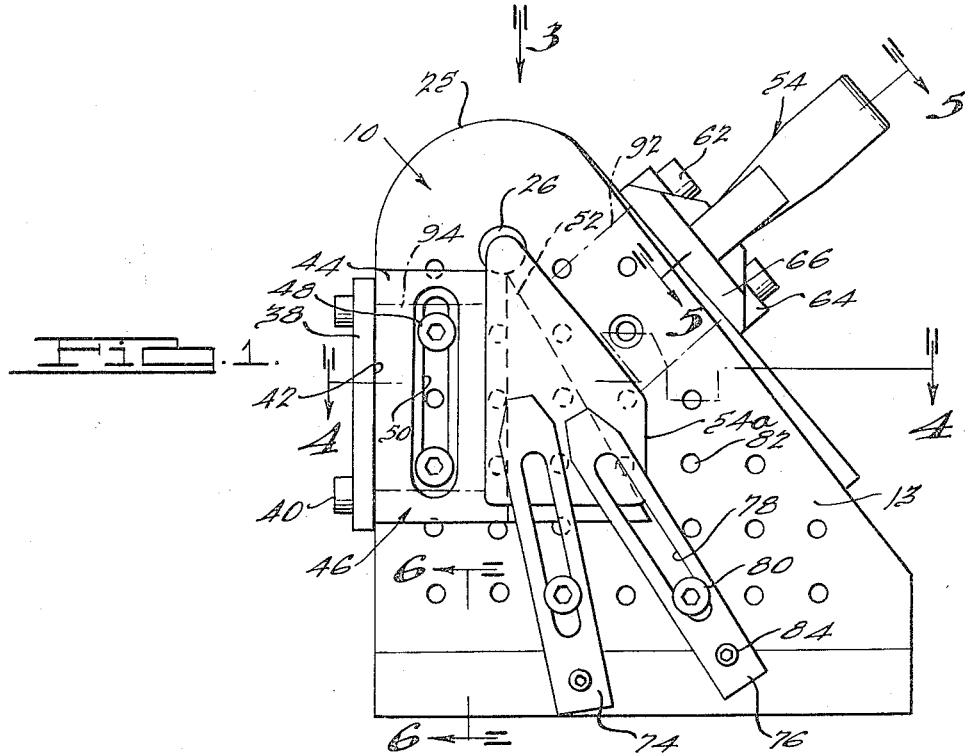
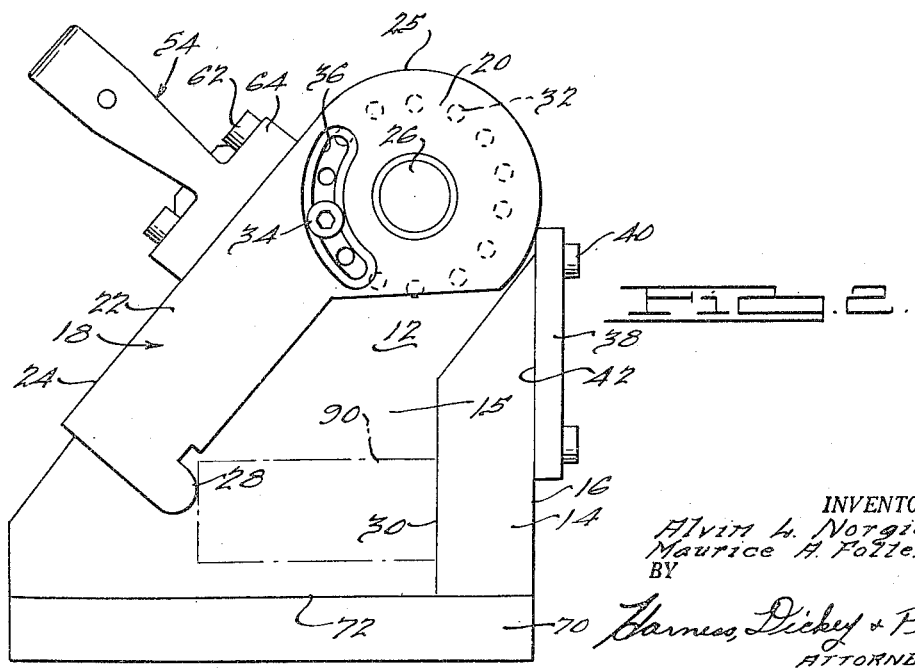
INVENTORS.
Alvin L. Norgiel
Maurice A. Pottebout
BY
Barnes, Dickey & Pierce
ATTORNEYS.

Oct. 9, 1956     A. L. NORGIEL ET AL     2,765,596
GRINDING JIG
Filed Jan. 7, 1954     3 Sheets-Sheet 2
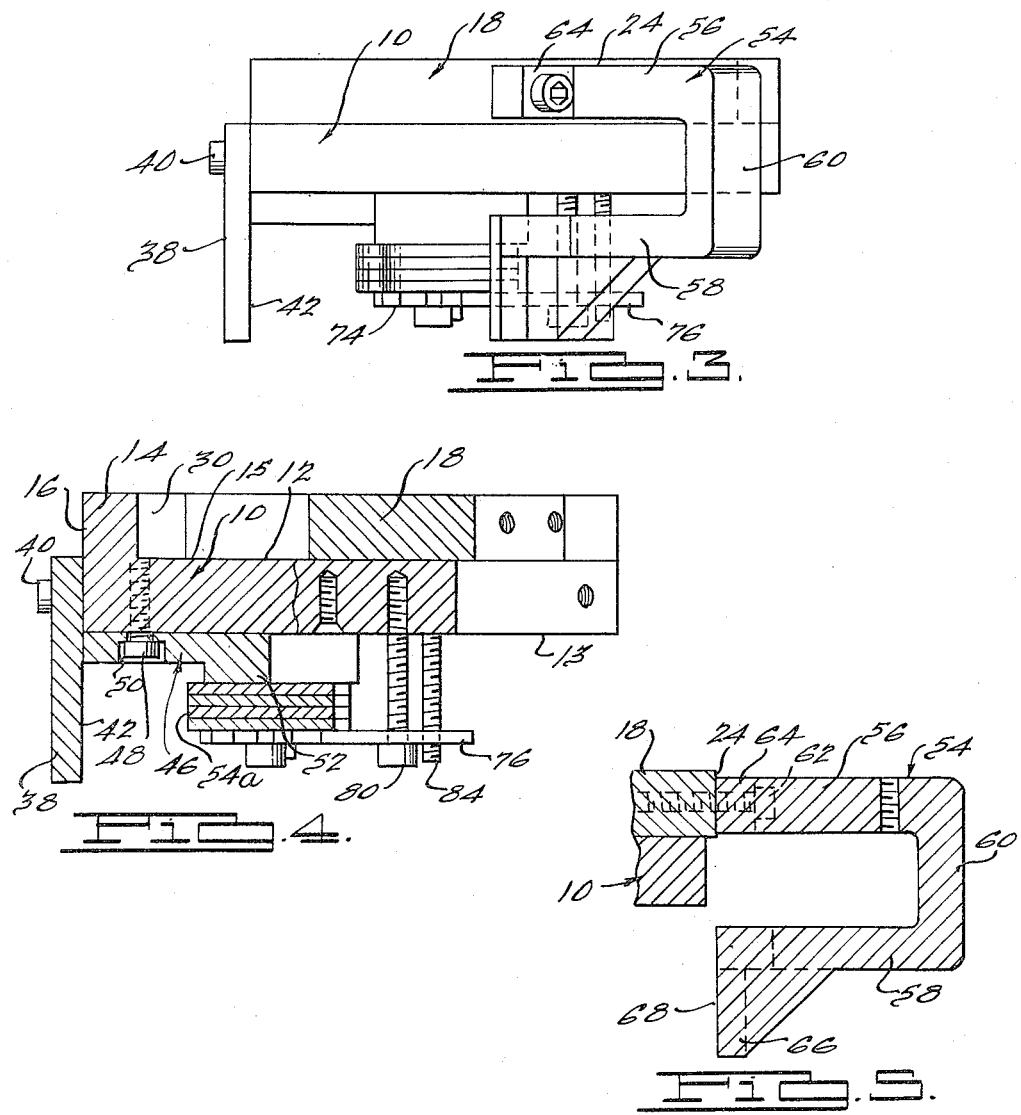
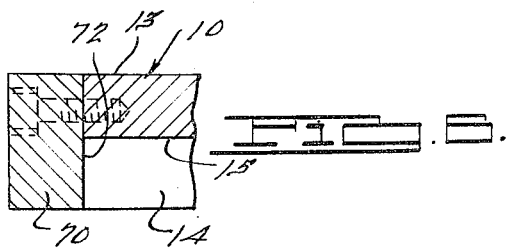
INVENTORS.
Alvin L. Norgiel
Maurice A. Follebout.
BY
Harness, Dickey & Pierce
ATTORNEYS

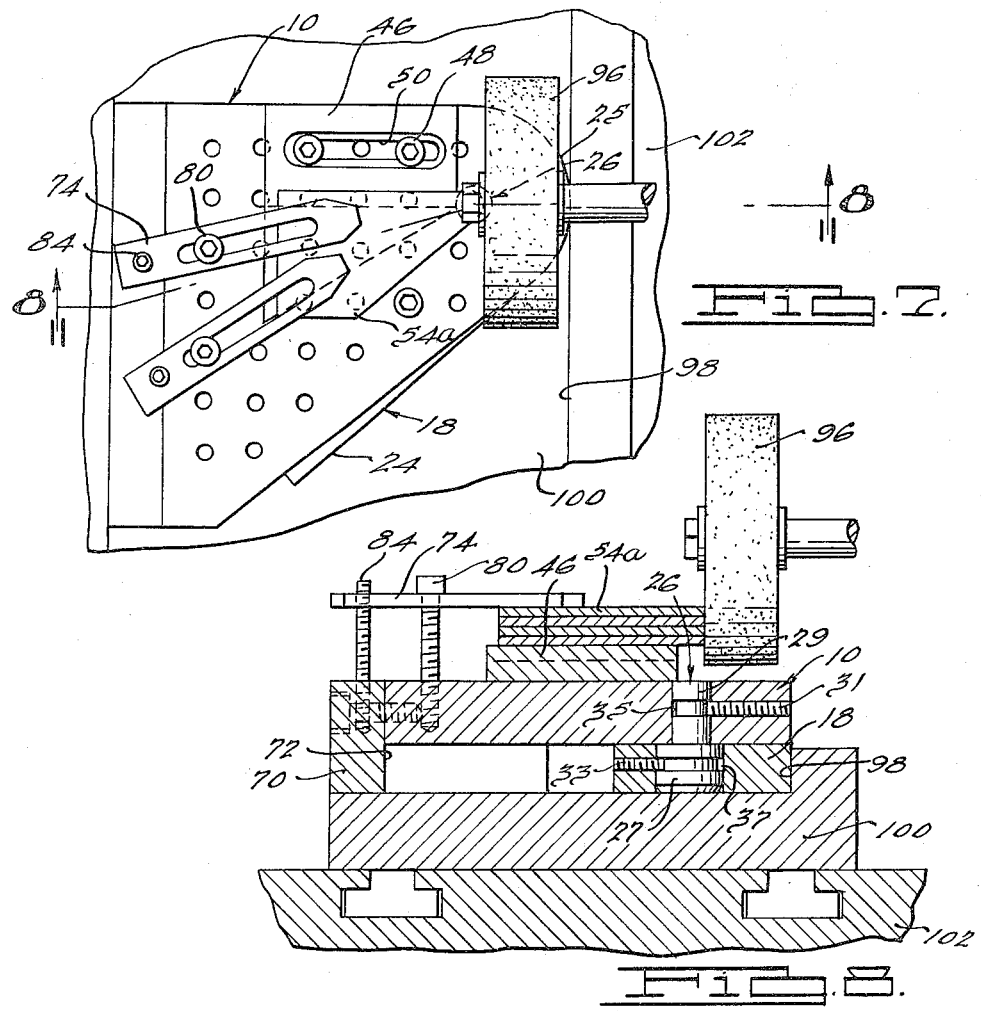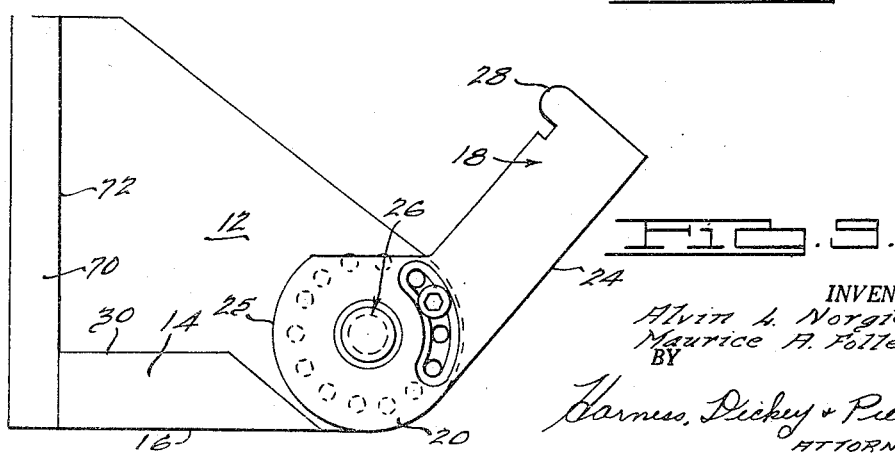

United States Patent Office 2,765,596
Patented Oct. 9, 1956

2,765,596

GRINDING JIG

Alvin L. Norgiel, Inkster, and Maurice A. Follebout, Detroit, Mich., assignors to De Soto Tool Co., Hazel Park, Mich., a partnership Application January 7, 1954, Serial No. 402,668

6 Claims. (Cl. 51—217)

This invention relates to holding and locating devices and more particularly to an improved jig particularly adapted for use in holding and guiding workpieces during the machining of radii thereon.

An object of the invention is to overcome disadvantages in prior jigs of the indicated character and to provide an improved jig which facilitates the precision machining of a radius tangent to two surfaces on a workpiece.

Another object of the invention is to provide an improved jig which may be easily and quickly adjusted to accommodate workpieces having surfaces disposed at various angles and which may be easily and quickly adjusted to permit the precision machining of any desired radii tangent to such surfaces, thereby facilitating the machining of a wide range of radii on workpieces of various sizes and shapes.

Another object of the invention is to provide an improved jig that is rugged in construction, economical to manufacture and assemble, durable, efficient and reliable in operation.

Another object of the invention is to provide an improved jig incorporating means which facilitates the accurate holding and guiding of a plurality of workpieces whereby radii tangent to two surfaces on each workpiece may be machined with a minimum of time, labor and expense.

Still another object of the invention is to provide an improved jig which reduces the setup time required to accurately locate and hold a plurality of workpieces so that radii tangent to two surfaces on such workpieces may be accurately machined thereon.

The above as well as other objects and advantages of the present invention will become apparent from the following description, the appended claims and the accompanying drawings wherein:

Figure 1 is a top plan view of a jig constructed in accordance with the present invention;

Fig. 2 is a bottom plan view of the jig illustrated in Fig. 1;

Fig. 3 is an elevational view of the structure illustrated in Fig. 1;

Fig. 4 is a sectional view of the structure illustrated in Fig. 1, taken on the line 4—4 thereof;

Fig. 5 is a sectional view of a portion of the structure illustrated in Fig. 1, taken on the line 5—5 thereof;

Fig. 6 is a sectional view of a portion of the structure illustrated in Fig. 1, taken on the line 6—6 thereof;

Fig. 7 is a top plan view of the jig illustrated in Fig. 1, showing the same positioned on a holding device adjacent a fragmentarily illustrated grinding machine;

Fig. 8 is a sectional view of the structure illustrated in Fig. 7, taken on the line 8—8 thereof; and Fig. 9 is a bottom plan view of the jig, but showing the sine bar rotated to another position.

Referring to the drawings, a preferred embodiment of the invention is shown incorporated in a jig particularly adapted for use in the precision grinding of radii tangent to at least two surfaces on each of a plurality of workpieces, although it will be understood that the invention is applicable to other uses. The jig is comprised of a generally right-triangularly shaped support plate 10 having a substantially flat portion 12 and a depending base portion 14 disposed along one side thereof. The upper and lower surfaces 13 and 15, respectively, of the flat portion 12 of the support plate 10 are substantially parallel and the edge 16 thereof is substantially perpendicular to the upper and lower surfaces 13 and 15 of the flat portion 12. The edge 16 serves as a guide surface during machining operations as will be described hereinafter in greater detail.

A sine bar, generally designated 18, having a head portion 20 and an elongate, substantially straight portion 22 is positioned adjacent the lower surface 15 of the portion 12 of the plate 10. The head portion 20 of the sine bar defines a segment of a circle of predetermined diameter and the edge 24 of the sine bar is substantially tangent to the peripheral surface 25 of head portion 20 of the sine bar. The sine bar is pivotally connected to the support plate 10 by pivot pin 26 having a head portion 27 and a shank portion 29, the longitudinal axis of which passes through the center of the circle of which the head portion 20 of the sine bar is a segment. A pair of spaced screws 31 and 33 are threadably fitted in the support plate 10 and sine bar 18, respectively, for the purpose of preventing axial movement of the pivot pin 26, the inner end portions of the screws 31 and 33 projecting into spaced annular grooves 35 and 37 provided in the shank portion 29 and the head portion 27 of the pivot pin 26.

An integral locating boss 28 is provided on the opposite end portion of the sine bar, the boss 28 preferably having the same radius as the shank 29 of the pivot pin 26. The center of the circle of which the boss 28 is a segment is located substantially the same distance from the edge 24 of the sine bar as the longitudinal axis of the pin 26 so that a line drawn through the axis of the pin and the center of the circle of which the boss 28 is a segment is parallel to the edge 24 of the sine bar. The center of the boss 28 is also located at a predetermined distance, as for example, 3 inches, from the axis of the pivot pin 26. The edge 16 of the support plate 10 is tangent to the arcuate surface 25 of the head portion 20 of the sine bar 18 while the edge 30 of the depending portion 14 is parallel to the edge 16 and inwardly spaced therefrom so as to be tangent to the periphery of the shank portion 29 of the pivot pin 26. Since the radii of the boss 28 and the shank of the pivot pin 26 are the same, the distance from the edge 30 to the boss 28 measured perpendicularly from the edge 30 is the same as the distance from the center of the boss 28 to a line extending through the center of the pin 26 parallel to the edge 30 of the depending portion 14. The edge 30 is preferably utilized as a locating surface for gauge blocks when it is desired to position the sine bar so that the edge 24 of the sine bar and the edge 16 of the support plate define an acute angle in the range from 0 to 60 degrees.

In order that the jig may be readily adjusted to accommodate workpieces having surfaces defining obtuse angles, as well as acute angles, a transversely extending base member 70 is provided and fixed to the support plate 10 at a predetermined distance from the pivot pin 26. The edge 72 of the base member 70 is substantially perpendicular to the edge 30 of the depending portion 14 of the support plate and serves as a locating surface when it is desired to position the sine bar 18 so that the edge 24 of the sine bar and the edge 16 of the support plate define an obtuse angle in the range from 60 degrees to 150 degrees as, for example, in the position shown in Fig. 9. When it is desired to position the sine bar 18 so that the angle defined by the edge 24 thereof and the edge 16 of the support plate 10 is an obtuse angle in the range from 150 degrees to 180 degrees, the edge 30 of the support plate 10 is preferably placed on a surface plate or other flat surface (not shown) and the sine bar 18 is adjusted by one's positioning gauge blocks between the surface plate and the edge 24 in a well-known manner. The lower surface of the base member 70 is preferably substantially co-planar with the lower surface of the depending portion 14 of the support plate 10 and the lower surface of the sine bar 18. Such a construction increases the stability of the jig and prevents cocking of the support plate during machining operations.

In order that the sine bar 18 may be locked in a selected adjusted position, a plurality of circumferentially spaced apertures 32 are provided in the support plate 10, the apertures 32 being radially outwardly spaced from the pivot pin 26 and adapted to threadably accommodate a setscrew 34 which projects through a counterbored arcuate slot 36 in the head portion 20. The depth of the counterbore in the slot 36 is such that the head of the setscrew 34 will be disposed entirely within the counterbore when the sine bar 18 is locked in the desired position thus preventing the head from interferring with the movement of the jig during the machining operation.

A locating plate 38 is releasably secured to the edge 16 of the support plate 10 by setscrews 40 which project through suitable apertures in the plate 38 and threadably engage selected internally threaded passageways provided in the support plate 10. When the locating member 38 is secured to the support plate 10, the surface 42 thereof is co-planar with the edge 16 of the support plate 10 and tangent to the arcuate surface 25 of the head portion 20 of the sine bar. The member 38 projects upwardly above the upper surface of the support plate 10 and above the upper surface of the flange portion 44 of a spacer member 46 positioned on the upper surface of the support plate 10, the spacer member 46 being releasably secured to the support plate by setscrews 48 which project through a counterbored slot 50 in the flange portion 44. The spacer member 46 also includes a raised pad portion 52 which serves to raise the workpieces 54a above the plane of the upper surface 13 of the support plate 10 during the machining of the workpieces so as to prevent damage to the support plate.

A generally U-shaped locating bracket 54 having spaced substantially parallel arms 56 and 58 joined by an integral web portion 60 is releasably secured to the edge 24 of the sine bar 18 by setscrews 62 which project through a transversely extending flange portion 64 provided on the free end of the arm 56 and threadably engage selected apertures in the sine bar 18. A transversely extending flange 66 is provided on the free end portion of the arm 58, the surface 68 of the flange 66 being co-planar with the edge 24 of the sine bar when the locating bracket 54 is secured to the sine bar. The surface 42 of the locating plate 38 and surface 68 of the locating bracket 54 serve as locating surfaces for gauge blocks when the workpieces are positioned on the jig, as will be described hereinafter in greater detail.

In order that a plurality of workpieces may be rigidly clamped to the support plate 10, a pair of clamps 74 and 76 are provided each having slots 78 extending longitudinally thereof. One end portion of each clamp bears against the upper surface of the uppermost workpiece while a setscrew 80 extends through the slot 78 of each clamp and threadably engages one of the spaced apertures 82 provided in the support plate 10. A screw 84 threadably engages an aperture provided in the other end portion of each clamp and the lower end of which screw 84 bears against the upper surface of the support plate 10 so as to clamp the workpieces on the pad portion 52 of the spacer member 46, the edge portions of the workpieces terminating in outwardly spaced relationship with respect to the pad portion 52.

The present invention facilitates the grinding of radii tangent to two surfaces on each of a plurality of workpieces. The radii may be of any desired length within the capacity of the jig and the two surfaces on each workpiece may be disposed in intersecting planes or in planes which are substantially parallel. Assuming that it is desired to machine radii on workpieces each having two surfaces intersecting at an angle of thirty degrees and that it is desired to machine a ¼ inch radius tangent to both of such surfaces on each workpiece, the sine of the angle of thirty degrees is first determined preparatory to setting the sine bar 18. Assuming that the distance between the axis of the pivot pin 26 and the center of the boss 28 is 3.0000 inches, the required distance between the periphery of the boss 28 and the edge 30 is then determined to be 1.5000 inches, such distance being determined by multiplying 3 inches by the sine of thirty degrees. A gauge block 90 measuring the distance 1.5000 is positioned on the lower surface 15 of the plate 10 so as to abut the edge 30 of the depending portion 14 and the sine bar is then pivoted about the axis of the pivot pin 26 so that the locating boss 28 abuts the opposite end of the gauge block, as shown in Fig. 2. The sine bar is then locked in the selected adjusted position by one's tightening the setscrew 34 in the most convenient aperture 32 aligned therewith.

Assuming that the radius of the arcuate surface 25 of the sine bar is 1 inch, gauge blocks 92 and 94 each measuring a distance of 0.7500 inch are positioned on the upper surface of the support plate 10 so as to abut the edge 68 of the locating bracket 54 and on the upper surface of the spacer member 46 so as to abut the edge 42 of the locating plate 38, as shown in Fig. 1. A plurality of workpieces are then positioned on the pad 52 so that the edges defining the angle thirty degrees abut the inner ends of the gauge blocks after which the workpieces are clamped in the located position by means of the clamps 74 and 76. When the workpieces are so located, a line bisecting the surfaces subtending the angle thirty degrees passes through the axis of the pivot pin 26.

The locating plate 38 and the locating bracket 54 are then removed from the support plate 10 by one's removing the screws 40 and 62, respectively.

As shown in Figs. 7 and 8, a radius tangent to the two surfaces on each of the workpieces may then be machined rapidly and accurately by one's mounting the jig adjacent a grinding wheel 96 or other machining tool so that the cutting surfaces of the machining tool are substantially co-planar with either of the aforementioned edges of the workpiece while the edge 24 of the sine bar or the edge 16 of the support plate bears against an upstanding, fixed guide surface 98 such as is conventionally provided on a magnetic chuck 100 which may be supported in any desired or well-known manner, as by the work table 102. The workpiece is then moved into contact with the cutting surface of the grinding wheel or other machine tool by one's moving the jig while successively maintaining the edges 24 and 25 of the sine bar and the edge 16 of the support plate against the upstanding fixed guide surface 98. The workpieces then move through an arc concentric with the arcuate surface 25 of the sine bar and since one edge of each workpiece is parallel to the edge 24 of the sine bar and the other edge of each workpiece is parallel to the edge 16 of the support plate, the radii machined on the workpieces will be tangent to both surfaces on each of the workpieces.

While a preferred embodiment of the invention has been shown and described, it will be understood that various changes and modifications may be made without departing from the spirit of the invention.

What is claimed is:

1. A device for holding and guiding a workpiece during the machining of a radius tangent to at least two surfaces on said workpiece, said device comprising a support plate having a guide surface adjacent one edge thereof, a movable element having an arcuate edge portion and an elongate straight edge portion substantially tangent to said arcuate portion, means pivotally connecting said element to said support plate for pivotal movement about a predetermined axis whereby said guide surface is substantially tangent to said arcuate edge portion, means for locating said straight edge portion in predetermined angular relationship with respect to said guide surface, a locating member having a substantially flat locating surface thereon, means for releasably securing said member to said support plate whereby said locating surface is substantially co-planar with said guide surface, a locating bracket having a pair of spaced arms joined at one end thereof, means for releasably securing one of said arms to said element whereby the free end of the other arm is substantially co-planar with and spaced from said straight edge portion, and means for clamping a workpiece to said support plate whereby one edge of said workpiece is positioned a predetermined distance from said guide surface and another edge of said workpiece is positioned a predetermined distance from said straight edge portion.

2. In a jig for holding and guiding a workpiece during the machining of a radius tangent to at least two surfaces on said workpiece, the combination comprising a support plate having an elongate substantially straight guide surface adjacent one edge thereof, a movable element having an arcuate outer edge portion and an elongate straight edge portion substantially tangent to said arcuate portion, means connecting said element to one side of said support plate for pivotal movement about a predetermined axis whereby said guide surface is substantially tangent to said arcuate edge portion, means for locating said straight edge portion in predetermined angular relationship with respect to said guide surface, means for releasably locking said element in a selected adjusted position, a locating member having a substantially flat locating surface thereon, means for releasably securing said member to said support plate whereby said locating surface is substantially co-planar with said guide surface, a locating bracket having a pair of spaced arms joined at one end thereof, means for releasably securing one of said arms to said element whereby the free end of the other arm is substantially co-planar with and spaced from said straight edge portion, and means for clamping a workpiece to the other side of said support plate whereby one edge of said workpiece is positioned a predetermined distance from said guide surface and another edge of said workpiece is positioned a predetermined distance from said straight edge portion.

3. A device for holding and guiding a workpiece during the machining of a radius on said workpiece, said device including a support plate having a guide surface adjacent one edge thereof, a movable sine bar, said sine bar having a head portion defining an arc of a circle and an elongate substantially straight body portion having an edge surface thereof substantially tangent to the arcuate surface of said head portion, pivot pin means pivotally connecting said head portion to one side of said support plate whereby said arcuate surface is substantially tangent to said guide surface, means for positioning said body portion in predetermined angular relationship with respect to said guide surface, means for locking said bar in a selected adjusted position, a locating member having a substantially flat locating surface thereon, means for securing said member to said support plate whereby said locating surface is substantially co-planar with said guide surface, a generally U-shaped bracket having a pair of spaced arms joined at one end thereof, means for securing one of said arms to said bar wherbey the free end of the other arm is substantially co-planar with and spaced from said straight edge portion, and means for clamping a workpiece to said support plate in predetermined spaced relationship with respect to said guide surface and edge surface of said body portion.

4. A device for holding and guiding a workpiece during the machining of a radius on said workpiece, said device including a support plate having a guide surface adjacent one edge thereof, a movable sine bar, said sine bar having a head portion defining an arc of a circle and an elongate substantially straight body portion having an edge surface thereof substantially tangent to the arcuate surface of said head portion, pivot pin means pivotally connecting said head portion to one side of said support plate whereby said arcuate surface is substantially tangent to said guide surface, means for positioning said body portion in predetermined angular relationship with respect to said guide surface, means for locking said bar in a selected adjusted position, a locating member having a substantially flat locating surface thereon, means for releasably securing said member to said support plate whereby said locating surface is substantially co-planar with said guide surface, a generally U-shaped bracket having a pair of spaced arms integrally joined at one end thereof, means for releasably securing one of said arms to said bar whereby the free end of the other arm is substantially co-planar with and spaced from said straight edge portion, and means for clamping a workpiece to said support plate in predetermined spaced relationship with respect to the said guide surface and said edge surface of said body portion.

5. In a device for holding and guiding a workpiece during the machining of a radius on said workpiece, the combination including a support plate having a depending flange portion adjacent one edge thereof providing a guide surface, a movable sine bar, said sine bar having a head portion defining an arc of a circle and an elongate substantially straight body portion having a pair of edge surfaces, one of said edge surfaces being substantially tangent to the arcuate surface of said head portion, the other of said edge surfaces having an arcuate locating boss thereon spaced a predetermined distance from the center of the circle defined by the arcuate surface of said head portion, pivot pin means pivotally connecting said head portion to one side of said support plate whereby said arcuate surface is substantially tangent to said guide surface, means for positioning said body portion in predetermined angular relationship with respect to said guide surface, means for locking said bar in a selected adjusted position, a locating member having a substantially flat locating surface thereon, means for releasably securing said member to said support plate whereby said locating surface is substantially co-planar with said guide surface, a generally U-shaped bracket having a pair of spaced arms integrally joined at one end thereof, means for releasably securing one of said arms to said bar whereby the free end of the other arm is substantially co-planar with and spaced from said one edge surface of said body portion, and means for clamping a workpiece to said support plate in predetermined spaced relationship with respect to the said guide surface and said one edge surface of said body portion.

6. A device for holding and guiding a workpiece during the machining of a radius on said workpiece including, in combination, a support plate having a depending flange portion adjacent one edge thereof providing a guide surface, a movable sine bar, said sine bar having a head portion defining an arc of a circle and an elongate substantially straight body portion having a pair of straight substantially parallel edge surfaces, one of said edge surfaces being substantially tangent to the arcuate surface of said head portion, the other of said edge surfaces having an arcuate locating boss thereon spaced a predetermined distance from the center of the circle defined by the arcuate surface of said portion, a pivot pin pivotally connecting said head portion to one side of said support plate whereby said arcuate surface is substantially tangent to said guide surface, means for positioning said one edge surface of said body portion in predetermined angular relationship with respect to said guide surface, means for locking said bar in a selected adjusted position, a locating member having a substantially flat locating surface thereon, means for releasably securing said member to said support plate whereby said locating surface is substantially co-planar with said guide surface, a generally U-shaped bracket having a pair of spaced arms integrally joined at one end thereof, means for releasably securing one of said arms to said bar whereby the free end of the other arm is substantially co-planar with and spaced from said one straight edge surface of said body portion, and means for releasably clamping a workpiece to said support plate in predetermined spaced relationship with respect to the said guide surface and said one edge surface of said body portion.

References Cited in the file of this patent

UNITED STATES PATENTS

| | | |
|---|---|---|
| 2,111,299 | Robbins | Mar. 15, 1938 |
| 2,113,874 | Chanik | Apr. 12, 1938 |
| 2,365,436 | Saucier | Dec. 19, 1944 |
| 2,555,453 | Mennie | June 5, 1951 |
| 2,589,489 | Fuhr | Mar. 18, 1952 |
| 2,600,432 | Sanders | June 17, 1952 |